US005721625A

United States Patent [19]
Furusawa et al.

[11] Patent Number: 5,721,625
[45] Date of Patent: Feb. 24, 1998

[54] METHOD AND APPARATUS FOR GENERATING HALFTONE IMAGE CONSIDERING SPATIAL FREQUENCIES OF ORIGINAL IMAGE

[75] Inventors: Katsuhiko Furusawa; Shoichi Shimada, both of Kyoto, Japan

[73] Assignee: Dainippon Screen Mfg. Co., Ltd., Kyoto, Japan

[21] Appl. No.: 402,211

[22] Filed: Mar. 10, 1995

[30] Foreign Application Priority Data

Mar. 18, 1994 [JP] Japan ................................ 6-074503

[51] Int. Cl.$^6$ .......................................... H04N 1/387
[52] U.S. Cl. ............................. 358/456; 358/459
[58] Field of Search ................... 358/456–460, 358/534–536, 261.2, 426; 395/102, 109; 382/176, 237, 210, 260, 270

[56] References Cited

U.S. PATENT DOCUMENTS

| | | |
|---|---|---|
| 4,414,581 | 11/1983 | Kato et al. ........................ 358/280 |
| 4,595,956 | 6/1986 | Kawamura et al. ............... 358/283 |
| 5,111,310 | 5/1992 | Parker et al. ..................... 358/456 |
| 5,198,910 | 3/1993 | Ng et al. .......................... 358/456 |

FOREIGN PATENT DOCUMENTS

| | | |
|---|---|---|
| 2508747 | 6/1982 | France. |
| 58-189641 | 11/1983 | Japan. |
| 61-285867 | 12/1986 | Japan. |
| WO80/02612 | 11/1980 | WIPO. |

OTHER PUBLICATIONS

Kwan Y. Wong et al., "Adaptive Switching of Dispersed and Clustered Halftone Patterns for Bi–Level Image Rendition", 1977 SID International Symposium, Digest of Technical Papers; Society for Information Display pp. 124 and 125.

*Primary Examiner*—Edward L. Coles, Sr.
*Assistant Examiner*—Stephen Brinich
*Attorney, Agent, or Firm*—Lowe, Price, LeBlanc & Becker

[57] ABSTRACT

The present invention is to generate a binary halftone image by taking full advantage of high resolution dots and low resolution dots. A Laplacian filter is applied to the density data of an original image to determine filtered density data representing spatial frequencies of the original image. A dot selection signal SEL for selecting one of the high resolution dots and the low resolution dots is generated based on a comparison between the filtered density data and a threshold data. A dot generator 32 includes a first SPM 48 for storing a threshold pattern of the low resolution dots and a second SPM 50 for storing a threshold pattern of the high resolution dots. A selector 52 receives threshold data DTH1 and DTH2 output from the first and the second SPMs 48 and 50 and selects one of the threshold data DTH1 and DTH2 in response to the dot selection signal SEL. A comparator 54 compares image data $D_{IM}$ with the selected threshold data and generates a dot signal Sd to record a binary halftone image.

14 Claims, 11 Drawing Sheets

Fig. 4(A) ORIGINAL IMAGE AREA

Fig. 4(B) EXPANDED IMAGE AREA

| | LINE BUFFER 21 | |
|---|---|---|
| DS(-1,-1) | DS( 0,-1) | DS( 1,-1) |
| DS(-1, 0) | DS( 0, 0) | DS( 1, 0) |
| DS(-1, 1) | DS( 0, 1) | DS( 1, 1) |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| DS(-1, n) | DS( 0, n) | DS( 1, n) |
| DS(-1, n+1) | DS( 0, n+1) | DS( 1, n+1) |

DS(X, Y):
X: SECONDARY SCANNING COORDINATE
Y: PRIMARY SCANNING COORDINATE

Fig. 6(A)
LAPLACIAN FILTER LF1

| →X | X-1 | X | X+1 |
|---|---|---|---|
| ↓Y Y-1 | 0 | 1 | 0 |
| Y | 1 | -4 | 1 |
| Y+1 | 0 | 1 | 0 |

Fig. 6(B)
LAPLACIAN FILTER LF2

| →X | X-1 | X | X+1 |
|---|---|---|---|
| ↓Y Y-1 | 1 | 1 | 1 |
| Y | 1 | -8 | 1 |
| Y+1 | 1 | 1 | 1 |

Fig. 9(A)

⇓ CONTRACTION (4-NEIGHBOUR WINDOW)

⇓ EXPANSION (8-NEIGHBOUR WINDOW)

THRESHOLD COMBINING CIRCUIT 70

Fig. 12(A) FIRST LUT 72

Fig. 12(B) SECOND LUT 74

METHOD AND APPARATUS FOR GENERATING HALFTONE IMAGE CONSIDERING SPATIAL FREQUENCIES OF ORIGINAL IMAGE

BACKGROUND OF THE INVENTION

1. Field of the Invention

The present invention pertains to a method of and an apparatus for generating a binary halftone image based on image data representing an original image.

2. Description of the Related Art

In color offset printing, an original image, such as a photograph image, is divided into four color separation images corresponding to four color inks, for example, yellow, magenta, cyan, and black. A printed image is then produced by overprinting the color separation images of the respective color inks one upon another.

An image on a printing plate for each color ink (hereinafter referred to as "printing plate image" or "halftone image") is expressed by small dots of the color ink, which are called "halftone dots". Halftone dots are arranged in lattice at a regular interval, and a ratio of the dot area per unit area represents the density of an image. A percentage of the dot area per unit area is generally called a halftone-dot percent or a dot percent.

The interval between halftone dots is defined by a screen ruling, and the orientation of a halftone-dot array is defined by a screen angle. The screen ruling represents the number of halftone dots formed per inch. The greater screen ruling produces a reproduced image with higher resolution. Conventionally, the screen ruling is set at about 175 lines/inch.

Recent advancement in printing technology allows to utilize halftone dots of a higher resolution as much as about 300 screen lines/inch or mere, which are called high definition halftone dots. The greater screen ruling makes each halftone dot smaller and allows an original image to be reproduced with higher resolution.

Halftone dots have a fixed structure of an array, and their size in an image area is varied according to the density of the image area. In other words, halftone dots represent the density of an image area by means of Amplitude Modulation. Recently, another method of representing the density of an image area by Frequency Modulation has been put to practical use, which is called FM screening or FM dot or stochastic screening. In the FM screening, ink dots have a fixed size, but dot spacing varies according to the density of the image area. Dots used in FM screening are much smaller than conventional halftone dots, and reproduce an original image with high resolution accordingly.

Unlike the conventional halftone dots, FM dots are not arranged at a regular interval. In this specification, a term 'printing dots' or simply 'dots' will be used to refer to both of the halftone dots and FM dots. The above-mentioned high definition halftone dots and the FM dots will be referred to as "high resolution dots" while halftone dots having a relatively low screen ruling, e.g. 175 lines/inch, will be referred to as "low resolution dots".

The high resolution dots reproduce details of an original image more clearly and precisely than the low resolution halftone dots. The small size of printing dots makes rosette moires sufficiently inconspicuous. The small high-resolution dots, however, have a drawback; it is difficult to reproduce the dot size precisely in printing of a halftone image. This means that the low resolution dot is preferable to the high resolution dot for the better reproducibility of the dot size. It is accordingly preferred to apply the high resolution dots to some areas of an original image and low resolution dots to the other areas.

SUMMARY OF THE INVENTION

An object of the present invention is accordingly to generate a binary halftone image by taking full advantage of high resolution dots and low resolution dots.

The present invention is directed to a method of generating a binary halftone image based on image data representing an original image. The method comprises the steps of: (a) measuring spatial frequencies in the original image; and (b) generating the binary halftone image by producing high resolution dots in a first image region and low resolution dots in a second image region, the first image region having spatial frequencies higher than a threshold frequency, the second image region having spatial frequencies lower than the threshold frequency.

The assignment of the high resolution dots to the first image region of high spatial frequencies will reproduce image details precisely and clearly, while the assignment of the low resolution dots to the second image region of low spatial frequencies will improve the reproducibility of the dot size.

In a preferred embodiment of the present invention, the step (a) comprises the steps of: (c) obtaining density data indicative of a density of each pixel in the original image from the image data of the original image; and (d) applying a second differential filter to the density data to thereby generate filtered density data indicative of a spatial frequency in the proximity of each pixel in the original image; and the step (b) comprises the steps of: (e) comparing the filtered density data with the threshold frequency to thereby generate a selection signal for each pixel; and (f) selecting one of the high resolution dots and the low resolution dots to each pixel in response to the selection signal.

Preferably, the step (f) comprises the step of: (g) dividing the original image into the first image region and the second image region based on a distribution of the selection signal.

In one embodiment of the step (g) comprises the steps of: dividing the original image into a plurality of unit areas of an identical size; and obtaining a logical sum of the selection signal for a plurality of pixels in each of the plurality of unit areas, to thereby identifying each of the plurality of unit area as one of the first and second image regions.

In another embodiment of the present invention, the step (g) comprises the steps of: displaying a binary image representing the distribution of the selection signal in the original image on a display device; and dividing the original image into the first image region and the second image region through interactive operation while observing the binary image displayed on the display device.

In still another embodiment of the present invention, the step (g) comprises the steps of: displaying a multi-valued image representing a distribution of the filtered density data on a display device; and dividing the original image into the first image region and the second image region through interactive operation while observing the multi-valued image displayed on the display device.

Preferably, the step (a) comprises the steps of: providing a first threshold pattern for the high resolution dots and a second threshold pattern for the low resolution dots; obtaining density data indicative of a density of each pixel in the original image from the image data of the original image;

applying a second differential filter to the density data to thereby generate filtered density data indicative of a spatial frequency in the proximity of each pixel in the original image; and determining a first coefficient for the high resolution dots and a second coefficient for the low resolution dots from the filtered density data of each pixel. The step (b) comprises the steps of: reading out a first threshold value from the first threshold pattern and a second threshold value from the second threshold pattern with respect to each pixel in the original image; multiplying the first threshold value by the first coefficient and the second threshold value by the second coefficient, and generating a third threshold value by adding the results of multiplication; comparing the image data with the third threshold with respect to each pixel in the original image, to thereby generate a dot signal representing the binary halftone image; and generating the binary halftone image from the dot signal.

The high resolution dots are frequency modulation dots whose spacing varies with image density.

The present invention is also directed to an apparatus for generating a binary halftone image based on image data representing an original image. The apparatus comprises: frequency measuring means for measuring spatial frequencies in the original image; and dot generation means for generating the binary halftone image by producing high resolution dots in a first image region and low resolution dots in a second image region, the first image region having spatial frequencies higher than a threshold frequency, the second image region having spatial frequencies lower than the threshold frequency.

These and other objects, features, aspects, and advantages of the present invention will become more apparent from the following detailed description of the preferred embodiments with the accompanying drawings.

DESCRIPTION OF THE PREFERRED EMBODIMENT

A. System Structure

Figure 1:
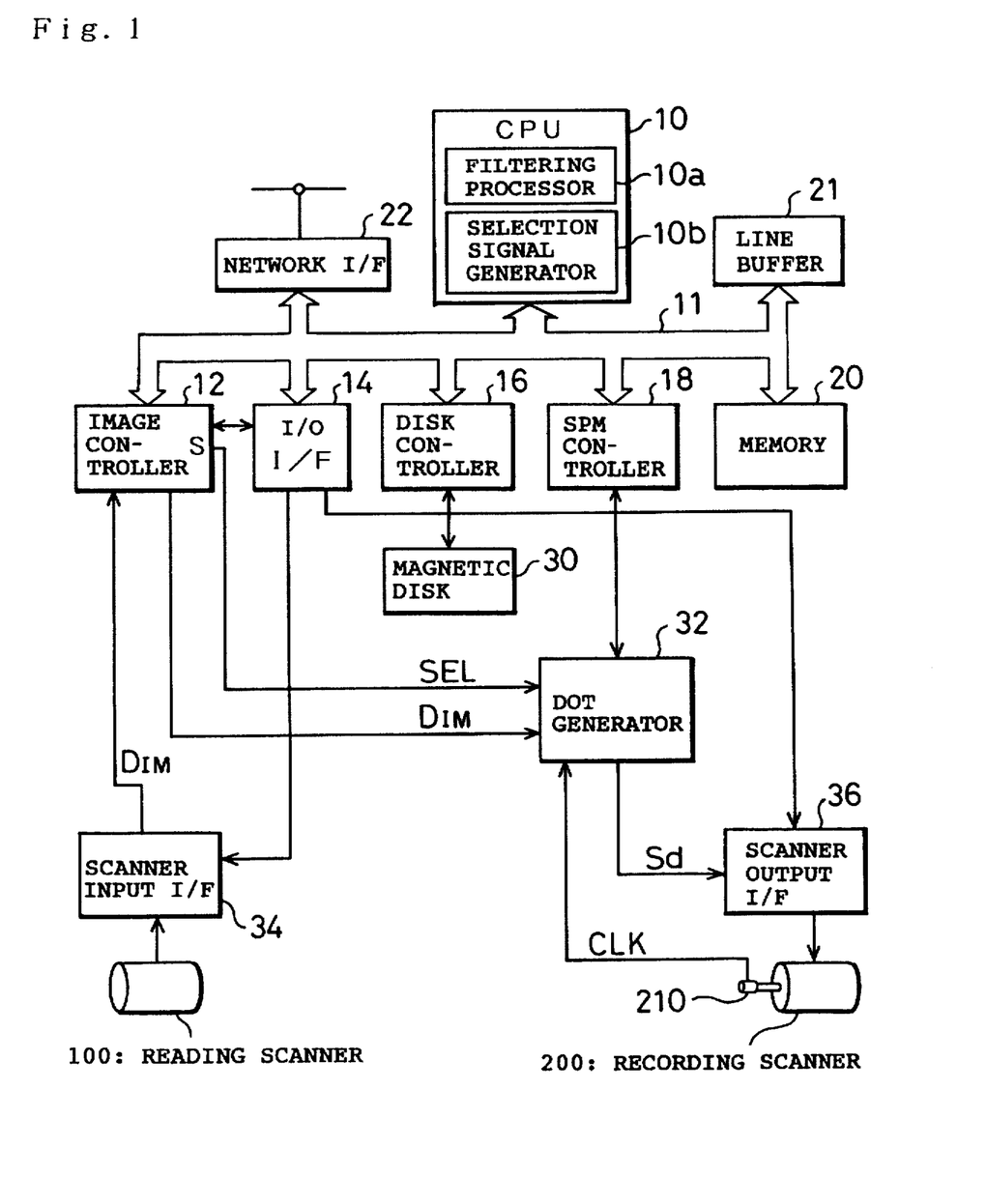
FIG. 1 is a block diagram illustrating the structure of a system for generating a binary halftone image according to an embodiment of the present invention.

FIG. 1 is a block diagram illustrating the structure of a prepress process system for generating a binary halftone image according to an embodiment of the present invention. The prepress process system includes: a CPU 10 functioning as an operation means for analyzing spatial frequencies in an original image; an image controller 12 functioning as a control means; an input/output interface 14; a disk controller 16; an Screen Pattern Memory (SPM) controller 18; a memory 20 as a memory means; a line buffer 21 as a two-dimensional expanding means; a network interface 22; a magnetic disk 30 controlled by the disk controller 16, working as a storage means; a dot generator 32 controlled by the SPM controller 18, functioning as a dot generating means; a scanner input interface 34; and a scanner output interface 36. The elements 10, 12, 14, 16, 18, 20, 21, and 22 are connected to one another via a 10 bus 11.

The prepress process system further includes a reading scanner 100 as an image input means connected with the scanner input interface 34; and a recording scanner 200 as an image output means connected with the scanner output interface 36.

Image data $D_{IM}$, representing a photograph image or other original image, are captured by the reading scanner 100 and transmitted to the image controller 12 via the scanner input interface 34. The image controller 12 stores the image data $D_{IM}$ into the magnetic disk 30 by means of Direct Memory Access (DMA) transfer. The network interface 22 is used to receive image data $D_{IM}$ from various devices on the network, such as an image data base and an image processing apparatus.

The image controller 12 synchronizes the elements of the system while a binary halftone image is recorded by the recording scanner 200. In recording a binary halftone image, the image controller 12 reads out the image data $D_{IM}$ from the magnetic disk 30 and transfers the image data $D_{IM}$ to the dot generator 32. The dot generator 32 subsequently converts the image data $D_{IM}$ to a dot signal Sd. The internal structure and operations of the dot generator 32 will be described later in detail. The dot signal Sd is transferred via the scanner output interface 36 to the recording scanner 200, which records a binary halftone image responsive to the dot signal Sd.

Figure 2:
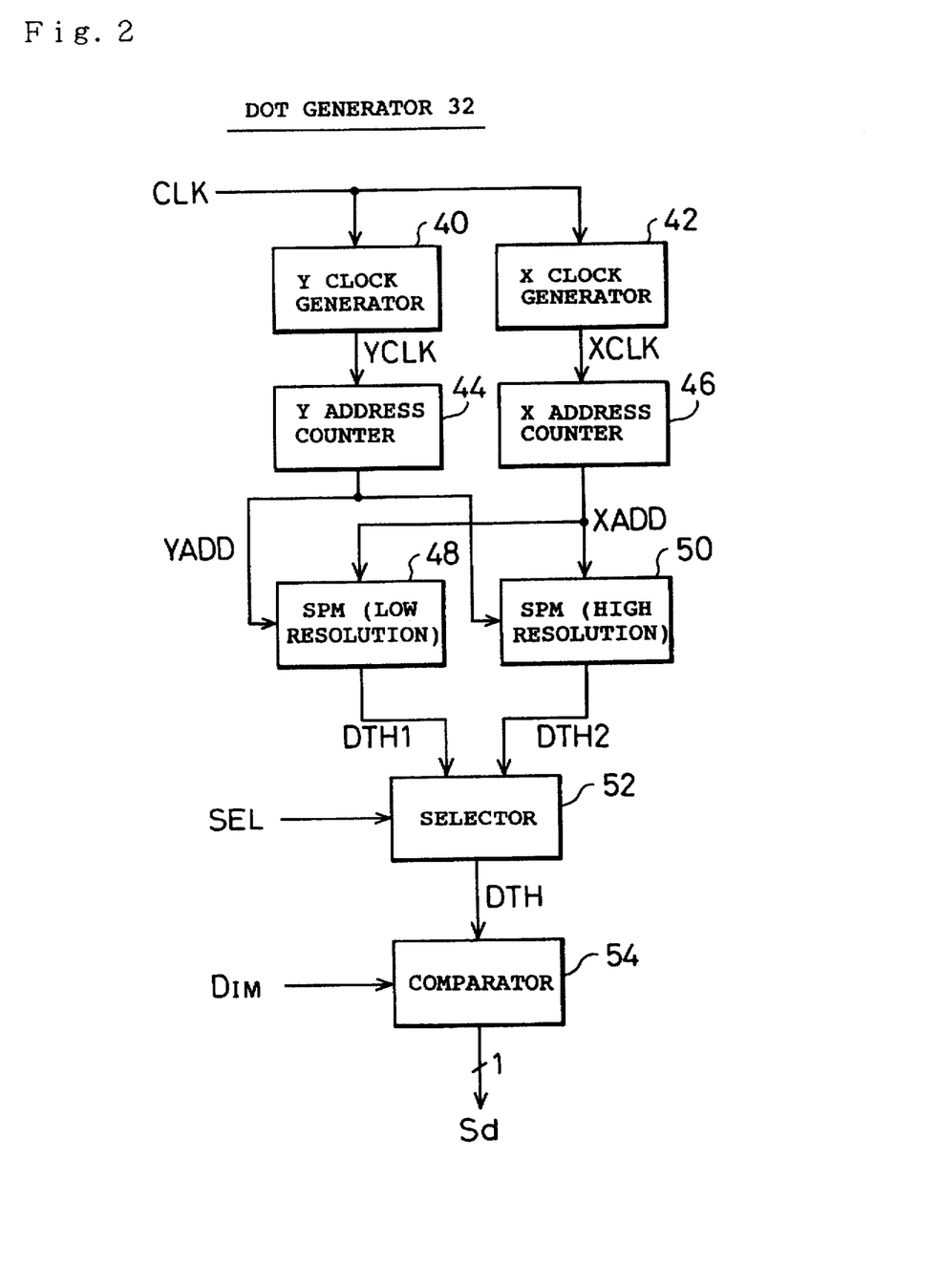
FIG. 2 is a block diagram showing an internal structure of a dot generator 32.

FIG. 2 is a block diagram showing the internal structure of the dot generator 32. The dot generator 32 includes: a primary-scanning clock generator (Y clock generator) 40; a secondary-scanning clock generator (X clock generator) 42; a primary-scanning address counter (Y address counter) 44; a secondary-scanning address counter (X address counter) 46; first and second screen pattern memories (SPM) 48 and 50; a selector 52 working as a selection means; and a comparator 54 working as a comparator means. The two SPMs 48 and 50 store threshold data used for converting the image data $D_{IM}$ to the dot signal Sd. The first SPM 48 stores threshold data DTH1 used in generating low resolution dots while the second SPM 50 stores threshold data DTH2 used in generating high resolution dots. Differences between the low resolution dots and the high resolution dots will be described later.

The Y clock generator 40 and the X clock generator 42 generate a primary scanning clock YCLK and a secondary scanning clock XCLK respectively from a reference clock CLK given from a rotary encoder 210 (FIG. 1) of the recording scanner 200. The Y address counter 44 is a ring-counter for counting the number of pulses of the primary scanning clock YCLK to generates a primary scanning address YADD for the SPMs 48 and 50. The X address counter 46 is a ring-counter for counting the number of pulses of the secondary scanning clock XCLK to generate a secondary scanning address XADD for the SPMs 48 and 50.

The primary scanning address YADD and the secondary scanning address XADD are commonly given to the SPMs 48 and 50. The SPMs 48 and 50 respectively output the threshold data DTH1 and DTH2 in response to the addresses. The selector 52 selects one of the two threshold data DTH1 and DTH2 in response to a dot selection signal SEL given from the image controller 12. The image controller 12 generates the dot selection signal SEL according to a process described later.

The comparator 54 compares the image data $D_{IM}$ transferred from the image controller 12 with the threshold data DTH (DTH1 or DTH2) output from the selector 52, and determines the level of the dot signal Sd based on the result of comparison. The recording scanner 200 receives the dot signal Sd and records a binary halftone image responsive to the dot signal Sd onto a recording medium such as a photosensitive film.

B. Process of Generating Dot Selection Signal

Figure 3:
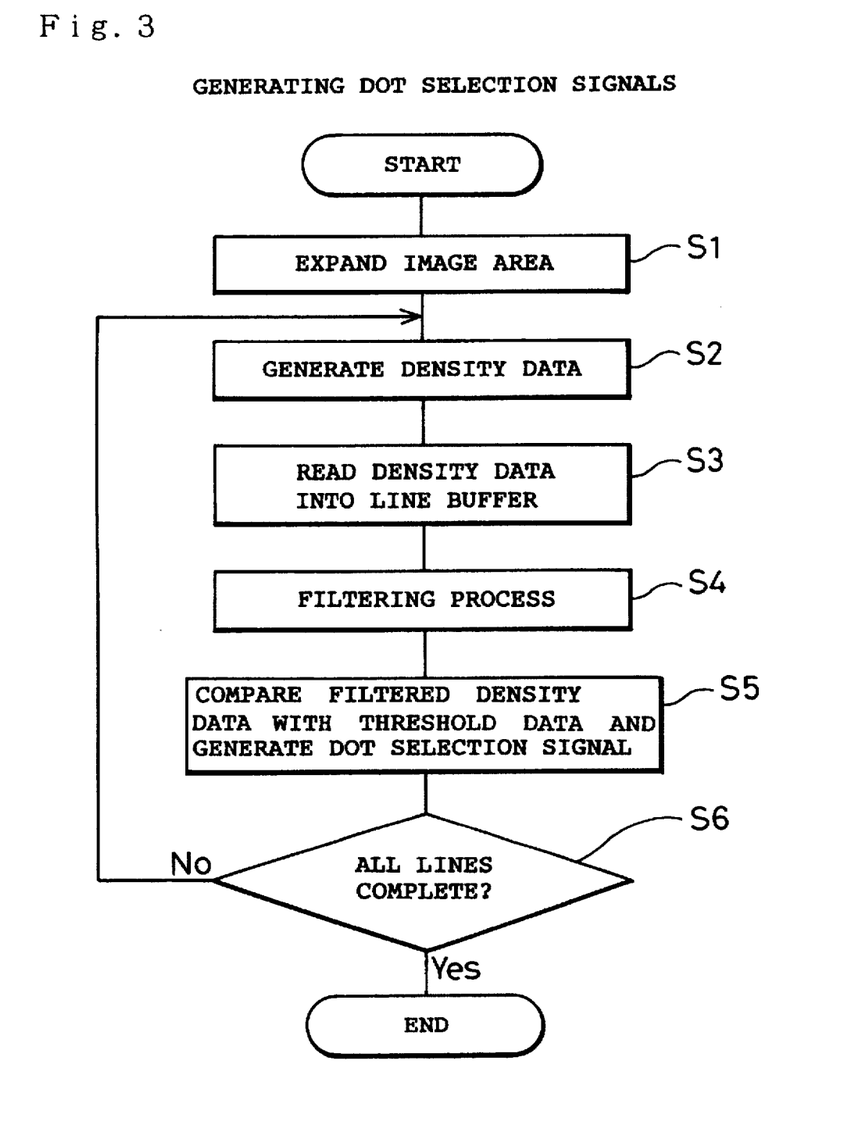
FIG. 3 is a flowchart showing a process routine of generating dot selection signals.

In the process of recording a binary halftone image, the dot selection signal SEL is generated to determine whether the high resolution dots or the low resolution dots are to be produced. FIG. 3 is a flowchart showing a process routine of generating the dot selection signal. This process routine is executed by a filtering processor 10a and a selection signal generator 10b shown in FIG. 1. The CPU 10 executes software programs stored in the memory 20 to implements the functions of the units 10a and 10b.

Figure 4A:
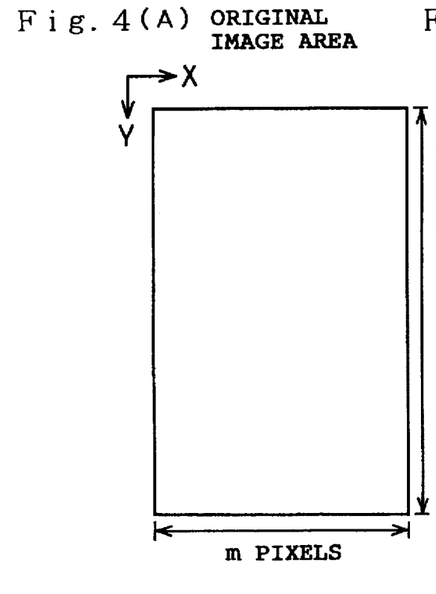
FIGS. 4(A) through 4(C) show a process of expanding an image area.
Figure 4B:
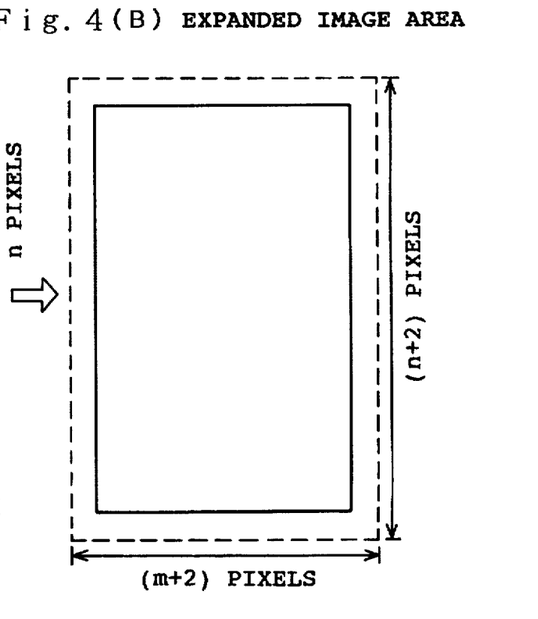
Figure 4C:
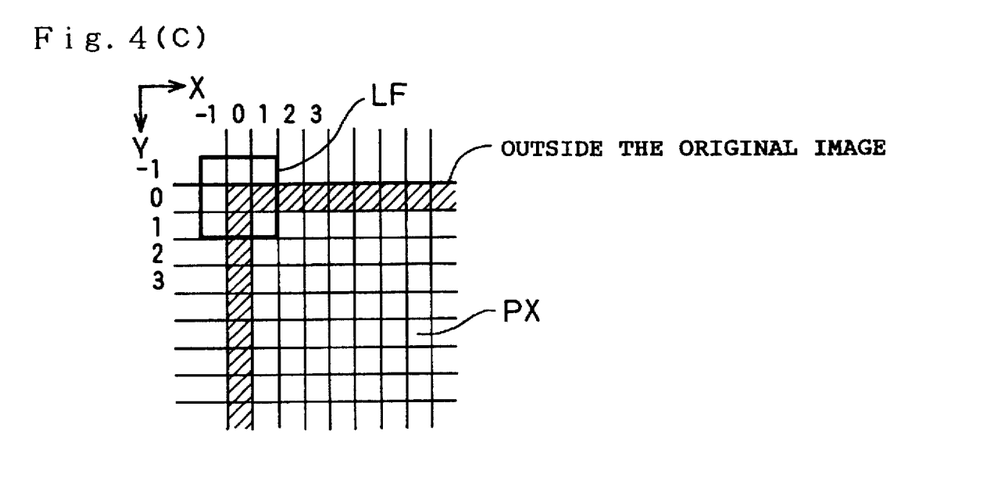

At step S1 in the flowchart of FIG. 3, the filtering processor 10a expands an image area of an original image by a width of one pixel. FIGS. 4(A) through 4(C) shows the process of expanding an image area. The filtering process is executed by applying a Laplacian filter LF of a predetermined size, for example, a 3×3 pixel matrix, to each pixel PX in the original image as shown in FIG. 4(C). In order to execute the filtering process on the outer-most pixels in the original image, which are filled with slant lines in FIG. 4(C), extra pixels are necessary outside the outer-most pixels in the original image area. Therefore, at step S1, image data for the outer-most pixels are copied to an area of a pixel width outside the outer-most pixels, to thereby expand the image area. For example, when the image area of the original image has a size of mxn pixels as shown in FIG. 4(A), the expanded image area consists of (m+2)×(n+2) pixels as shown in FIG. 4(B). As illustrated in FIG. 4(C), pixel coordinates (X,Y) are (0,0) at an origin (upper-left point) of the original image area, and (−1,−1) at the upper-left point of the expanded image area. Image data of the expanded image area are stored in the magnetic disk 30.

At step S2, the filtering processor 10a reads out image data for one scanning line from the magnetic disk 30 and generates density data DS from the image data. For example, when the image data has a yellow component Y, a magenta component M, a cyan component C, and a block component K, the density data DS is given by:

$$DS = a1*Y + a2*M + a3*C + a4*K \quad (1)$$

where a1 through a4 are coefficients.

The density data DS is a total of the components Y, M, C, and K of the image data weighed by the coefficients a1-a4, respectively. The weighting coefficients a1-a4 can be set in various ways. In one preferable example, the coefficient a2 for the magenta component is set equal to one whereas the other coefficients are equal to zero. This is because the magenta component, in many cases, distinguishably represents the high-frequency component of the density variation in the image.

In general, at least one of the four weighting coefficients a1-a4 are to be set at a non-zero value. The density data DS may not precisely represent the total density of the original image but it may express some kind of density of each pixel in the original image.

Figure 5:
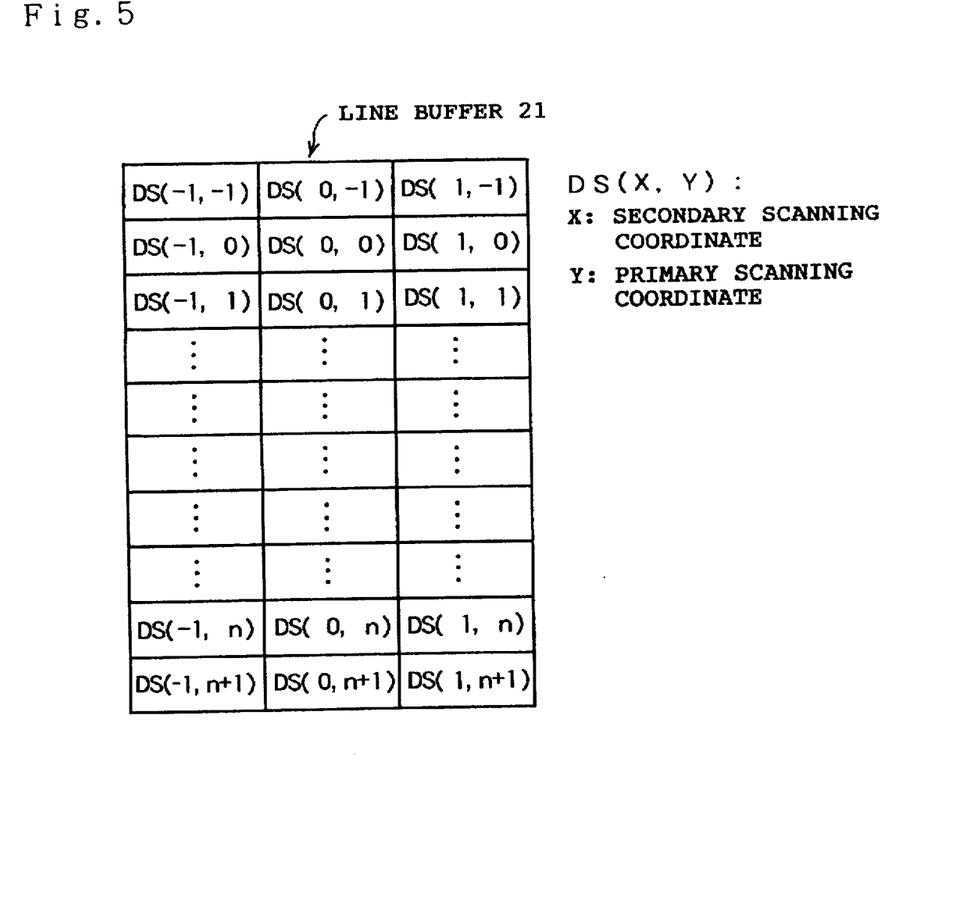
FIG. 5 shows density data DS stored in a line buffer 21.

At step S3 in the flowchart of FIG. 3, the density data DS for one scanning line generated at step S2 are written into the line buffer 21. FIG. 5 shows the content stored in the line buffer 21. The line buffer 21 is a memory for storing the density data DS for a predetermined number of scanning lines, for example, for three scanning lines, which is equal to the side width of the Laplacian filter LF used in the filtering process. At a first execution cycle of steps S2 and S3 in the process routine of FIG. 3, the density data DS for three scanning lines are generated and written in the line buffer 21.

In FIG. 5, the density data DS for each pixel is referred to as DS(X,Y), where X and Y respectively denote a secondary-scanning coordinate and a primary-scanning coordinate of the pixel. In the state of FIG. 5, the line buffer 21 stores the density data DS for the three scanning lines whose secondary-scanning coordinates X are −1, 0, and 1, respectively. The scanning line at X=−1 is supplemented on the left side of the image area of the original image by the expansion process shown in FIG. 4(C). The pixels at Y=−1 and Y=(n+1) are supplemented above and below the image area of the original image by the expansion process.

Figure 6A:
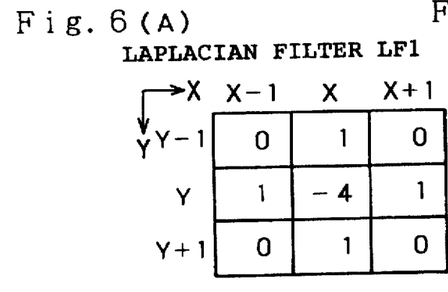
FIGS. 6(A) and 6(B) are plan views illustrating Laplacian filters.
Figure 6B:
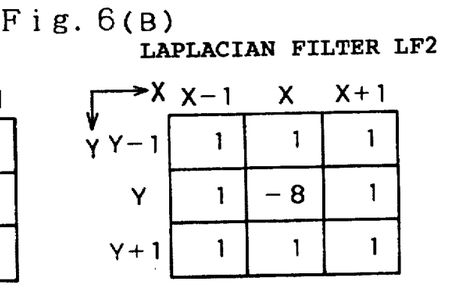
Figure 7A:
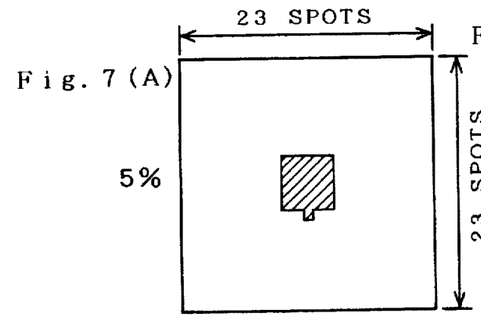
FIGS. 7(A) through 7(G) show a density-based variation in the shape of a square dot or a low resolution dot.
Figure 7B:
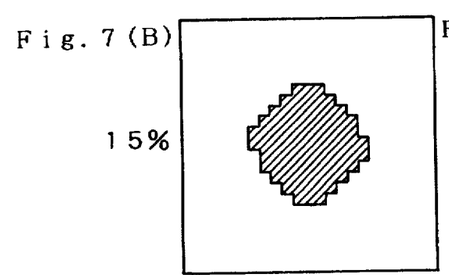
Figure 7C:
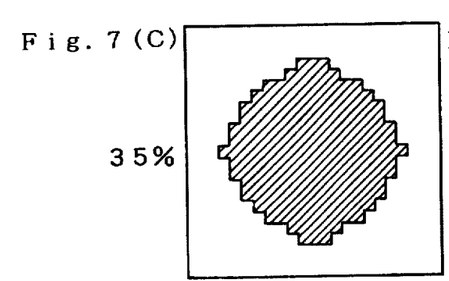
Figure 7D:
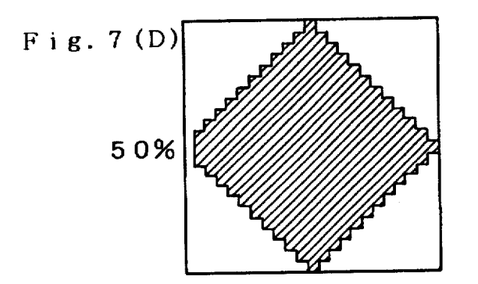
Figure 7E:
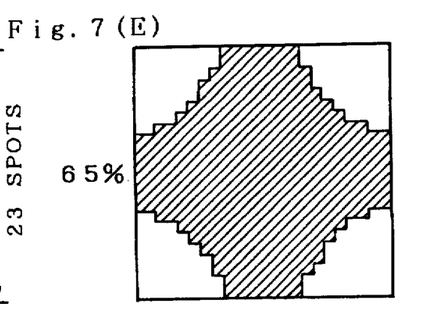
Figure 7F:
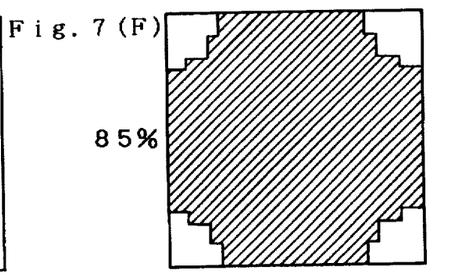
Figure 7G:
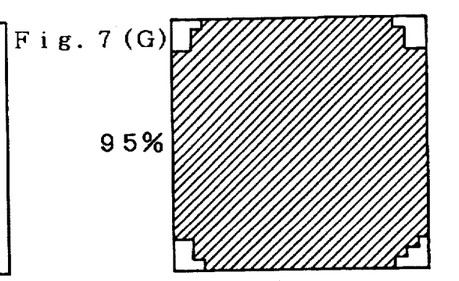
Figures 8A, 8E:
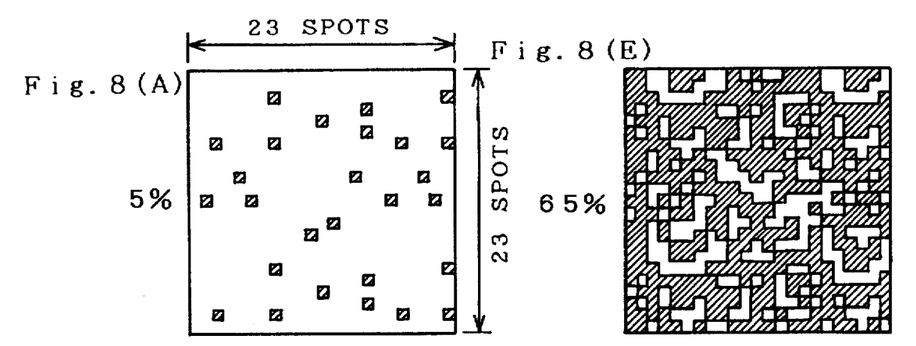
FIGS. 8(A) through 8(G) show a density-based variation in the shape of FM dots or high resolution dots.
Figure 8B:
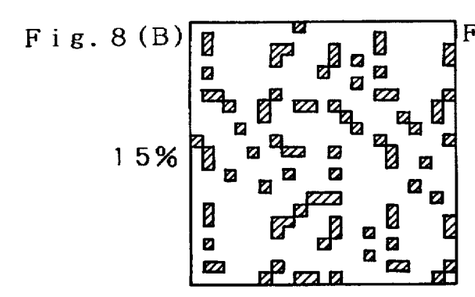
Figure 8C:
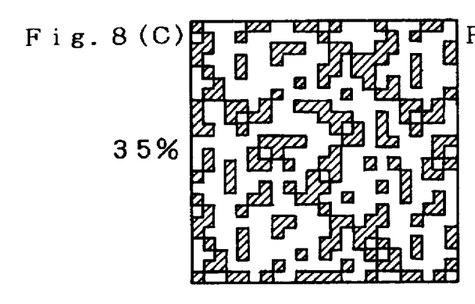
Figure 8D:
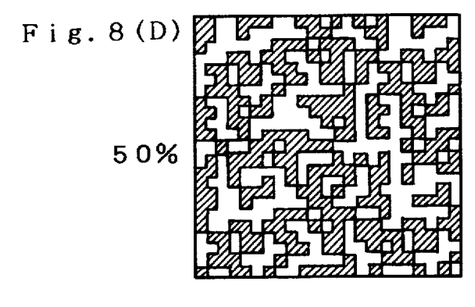
Figure 8F:
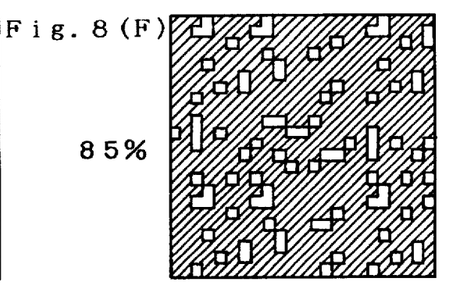
Figure 8G:
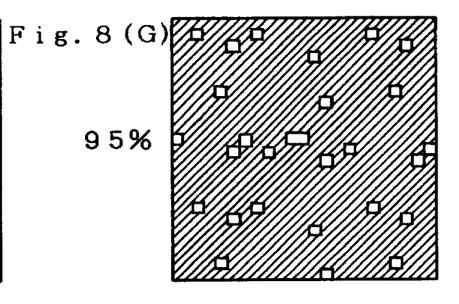

At step S4, the filtering processor 10a executes the filtering process on the density data DS stored in the line buffer 21. In the filtering process, the Laplacian filter LF of 3×3 matrix is applied to each 3×3 density data to obtain a filtered value for a target pixel at the center, which exists on the central line of the three scanning lines. FIGS. 6(A) and 6(B) illustrate examples of Laplacian filters LF1 and LF2 adoptable in the filtering process.

For example, the Laplacian filter LF1 shown in FIG. 6(A) is applied to the density data to execute a product-sum operation, and an absolute value of the sum is determined as filtered density data FDS(X,Y):

$$FDS(X,Y) = |DS(X,Y-1) + DS(X-1,Y) - 4*DS(X,Y) + DS(X+1,Y) + DS(X,Y+1)| \quad (2)$$

The filtered density data FDS indicates the degree of density variation in the vicinity of each target pixel. Various differential operators of a second order other than the Laplacian filters shown in FIGS. 6(A) and 6(B) can be used as spatial filters. The size of the filter can be greater than the 3×3 matrix.

At step S5, the selection signal generator 10b compares the filtered density data FDS with threshold data TH to generate the dot selection signal SEL as follows:

If TH<FDS: SEL=1 (selecting high resolution dots); and
If TH≧FDS: SEL=0 (selecting low resolution dots).

When the filtered density data FDS is greater than the threshold data TH, the spatial frequency is high in the vicinity of the target pixel. The dot selection signal SEL is accordingly set equal to one, which means selection of the high resolution dots. When the filtered density data FDS is equal to or less than the threshold data TH, on the contrary, the spatial frequency is low in the vicinity of the target pixel.

The dot selection signal SEL is accordingly set equal to zero, which means selection of the low resolution dots. Based on the results of comparison between the filtered density data FDS and the threshold data TH, the high resolution dots are assigned to the areas having a relatively steep density change whereas the low resolution dots are allocated to the other areas having a relatively gentle density change.

The value of the threshold data TH is determined empirically by examining the results of applying the Laplacian filter to actual original images. For example, when the original image data $D_{IM}$ and the density data DS and FDS are 8-bit digital data, a preferable value for the threshold data TH is about 140. The threshold data TH also depends on the coefficients of the Laplacian filter LF.

After the dot selection signal SEL is generated for one scanning line at step S5, the program goes to step S6 at which it is determined whether the process is completed for all the scanning lines. When not completed, the program returns to step S2 to generate the density data DS for a next scanning line, and the density data DS is written in the line buffer 21 at step S3. At step S3, the density data DS for the oldest one of the three scanning lines in the line buffer 21 are replaced by the new density data DS. For example, the density data DS(−1,0) through DS(−1,n+1) for the oldest scanning line shown in FIG. 5 are replaced by the new density data DS(2,0) through DS(2,n+1) for a new scanning line. In this case, the new density data for a new scanning line are considered to exist on the right-side of the line buffer 21 in the filtering process at step S4.

Steps S2 through S6 are repeated to update the density data DS by one scanning line, to store the update density data DS in the line buffer 21, to execute the filtering process with respect to the density data DS stored in the line buffer 21, and to generate the dot selection signal SEL based on the filtered density data FDS. Although the dot selection signal SEL is stored in the magnetic disk 30 in the embodiment, the dot selection signal SEL may not be stored in the magnetic disk 30 but generated at real time when the recording scanner 200 records a binary halftone image.

C. Recording of Halftone Image

In recording a binary halftone image by the recording scanner 200, the image data $D_{IM}$ and the dot selection signal SEL stored in the magnetic disk 30 are read out simultaneously and supplied to the dot generator 32 while their timings are adjusted by the image controller 12.

As illustrated in FIG. 2, the dot selection signal SEL is given to the selector 52, and the image data $D_{IM}$ is transmitted to the comparator 54. The selector 52 selects one of the two threshold data DTH1 and DTH2 output from the two SPMs 48 and 50 for each pixel in response to the dot selection signal SEL, and transfers the selected data to the comparator 54. When the dot selection signal SEL is equal to zero, the selector 52 selects the first threshold data DTH1 for the low resolution dots. When the dot selection signal SEL is equal to one, on the contrary, the selector 52 selects the second threshold data DTH2 for the high resolution dots. The comparator 54 compares the selected threshold data DTH with the image data $D_{IM}$ to generate the binary dot signal Sd.

FIGS. 7(A) through 7(G) show a sequence of shape change of a square dot or a low resolution dot according to density change, and FIGS. 8(A) through 8(G) show the sequence of FM dots or high resolution dots. Each of FIGS. 7(A) through 7(G) shows one halftone dot area having a size of 23 spots by 23 spots. The spot denotes a record pixel, which is a unit of recording in the recording scanner 200. Each of FIGS. 8(A) through 8(G) shows high resolution dots in the area of 23 spots by 23 spots. In the square dot area shown in FIGS. 7(A) through 7(G), the size of the black dot area increases with the density. In the FM dots shown in FIGS. 8(A) through 8(G), on the other hand, the positional frequency of black dots increases with the density. One pixel of image data $D_{IM}$ has, for example, the size of 10 spots by 10 spots.

The first SPM 48 (FIG. 2) stores a threshold pattern of the threshold data DTH1 representing the density-dependent change of the square dot shown in FIGS. 7(A) through 7(G). The threshold data DTH1 is read out according to the addresses YADD and XADD. The second SPM 50 stores a threshold pattern of the threshold data DTH2 representing the density-dependent change of the FM dots shown in FIGS. 8(A) through 8(G). The threshold data DTH2 is also read out according to the addresses YADD and XADD. The threshold pattern of the square dot or that of the FM dots are repeatedly applied without any gaps on an image plane of a recorded image. In order to implement the repeated application of the threshold pattern, the address counters 44 and 46 execute the ring counting at predetermined periods. On the assumption that the first SPM 48 and the second SPM 50 store threshold patterns in the area of 23×23 spots, the address counters 44 and 46 execute the ring counting to produce the addresses YADD and XADD in the range of 0 through 22, respectively. In actual application, both the SPM 48 and 50 store threshold patterns greater than 23×23 spots in size.

Each FM dot is small in size and arranged at random, thus making rosette moires inconspicuous and preventing object moires which are generally caused by interference of a picture pattern with an array of dots. Further, the small FM dots have an advantage of high reproducibility in details of the image. In reproduction of a color print by overprinting a plurality of color separation images, different threshold patterns are used for the respective color separations to produce their halftone images. This effectively prevents color shift, or deviation of colors in a resulting print from proper colors, due to registering mismatch of plates in printing process.

There is a type of FM dots whose spacing is changed according to the density while the spot size is fixed, and another type whose spot size depends on the density as well as its spacing. The present invention can apply to both types of FM dots. In this specification, "FM dots" are defined to be the dots whose spacing is at least varied with the density. The resolution power of the FM dots is greater than about 600 dpi (dot per inch), and more preferably greater than about 800 dpi. When the FM dots are recorded by a high-resolution recording scanner whose resolution is as high as 4,000 dpi, each FM dot may be set equal to an area of 2×2 spots or 3×3 spots of the recording scanner. This prevents the size of each dot from being excessively small and improves the dot reproducibility in printing.

Other types of high resolution dots other than the FM dots can be also used in the present invention. High resolution dots are halftone dots having a screen ruling as high as about 300 screen lines per inch or more while a low resolution dot has a screen ruling of about 200 lines per inch or a less. The high resolution dot is small in size, which effectively prevents rosette moires and improves the reproducibility of image details.

The low resolution dot is inferior to the high resolution dot in the reproducibility of image details but has better reproducibility of the dot size in printing process than the high resolution dot, especially in the image areas having relatively uniform density.

As described above, the Laplacian filter is applied to the density data DS to obtain the filtered density data FDS representing the spatial frequencies in the image. The high resolution dots are applied to the pixels having the higher spatial frequencies than a threshold value whereas the low resolution dots are applied to the pixels having the lower spatial frequencies than the threshold value. In the image areas having relatively high spatial frequencies, the image details are clearly reproduced by the high resolution dots. In image areas having relatively low spatial frequencies, on the other hand, the low resolution dots improve the reproducibility of the dot size in printing process.

D. Image Region Separation

In the above embodiment, the dot selection signal SEL is generated for each pixel in order to select one of the high resolution dot and the low resolution dot. In another possible embodiment described below, an original image is divided into first-type image regions to which the low resolution dots are applied and second-type image regions to which the high resolution dots are applied, based on the distribution of the dot selection signals SEL.

Figure 9A:
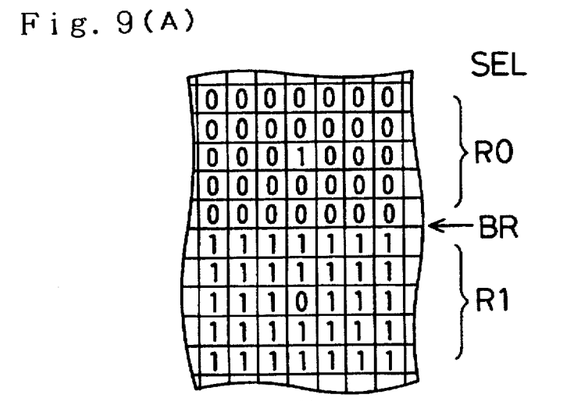
FIGS. 9(A) through 9(E) show a process of separating image areas based on the distribution of a dot selection signal SEL.

FIGS. 9(A) through 9(E) show a process of the region separation based on the distribution of the dot selection signal SEL. FIG. 9(A) shows a distribution of the value of the dot selection signal SEL. A border BR shown by the arrow distinguishes two regions R0 and R1. The region R0 is a low-resolution dot region where the value '0' of the dot selection signal SEL is predominant, and the region R1 is a high-resolution dot region where the value '1' is predominant. The low-resolution dot region R0 includes an isolated pixel having the value '1' of the dot selection signal SEL while the high-resolution dot region R1 also includes an isolated pixel having the value '0'. Isolated point reduction process is executed to eliminate such isolated pixels.

Figure 9B:
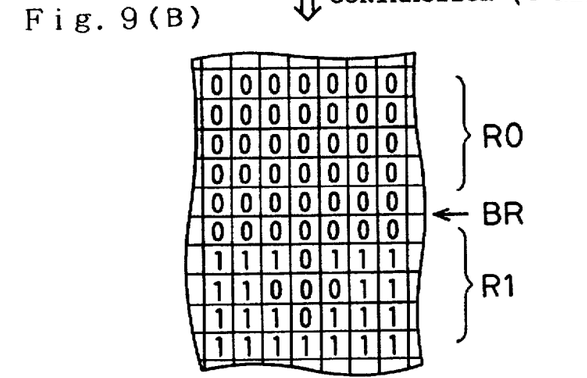

In the isolated point reduction process, the areas which have the value '1' of the dot selection signal SEL are contracted with a 4-neighbor window, whereby the distribution of the dot selection signal SEL is changed as shown in FIG. 9(B). The 4-neighbor window is a 3×3 window shown in FIG. 9(D), which assigns a value '0' to the center pixel CP upon condition that the dot selection signal SEL is equal to zero in at least one of the four pixels, shaded in FIG. 9(D), which are above, below, on the right of, and on the left of the center pixel CP. The contraction process eliminates the isolated pixel included in the low-resolution dot region R0 as illustrated in FIG. 9(B).

Figure 9C:
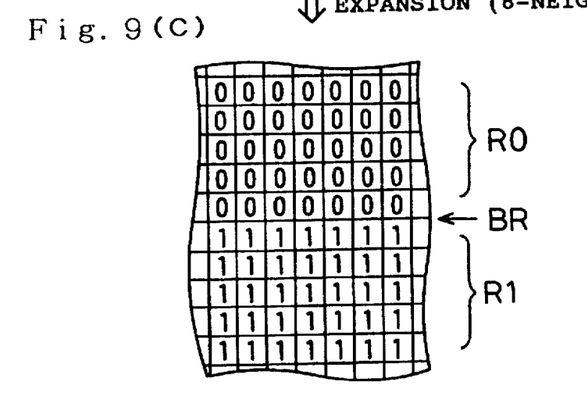
Figure 9D:
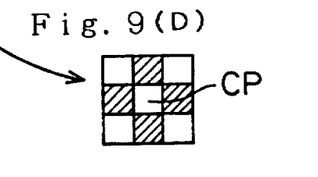
Figure 9E:
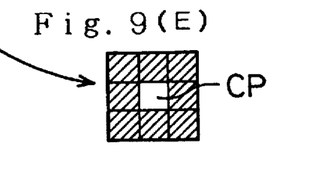

With respect to the distribution of FIG. 9(B), the areas which have the value '1' of the dot selection signal SEL are then expanded with an 8-neighbor window, whereby a distribution of the dot selection signal SEL is changed as shown in FIG. 9(C). The 8-neighbor window is a 3×3 window shown in FIG. 9(E), which assigns a value '1' to the center pixel CP upon condition that the dot selection signal SEL is equal to one in at least one of the eight pixels, filled with slant lines in FIG. 9(E), surrounding the center pixel CP. As shown in FIG. 9(C), the expansion process returns the border BR between the low-resolution dot region R0 and the high-resolution dot region R1 to the original state of FIG. 9(A). The expansion process eliminates the isolated pixel included in the high-resolution dot region R1 of FIG. 9(A).

The contraction and expansion process effectively eliminates the isolated points and accordingly divides an image area into the high resolution dot regions and the low resolution dot regions. Although both the contraction width and the expansion width are one pixel in the example of FIGS. 9(A) through 9(E), the contraction and the expansion can be executed for the width of two or more pixels.

Another possible method of image region separation is to divide an original image area into rectangular regions of a predetermined size and obtain a logical sum of the dot selection signals SEL in each rectangular region, so as to assign each rectangular region to either the high-resolution dot region or the low-resolution dot region.

Figure 10:
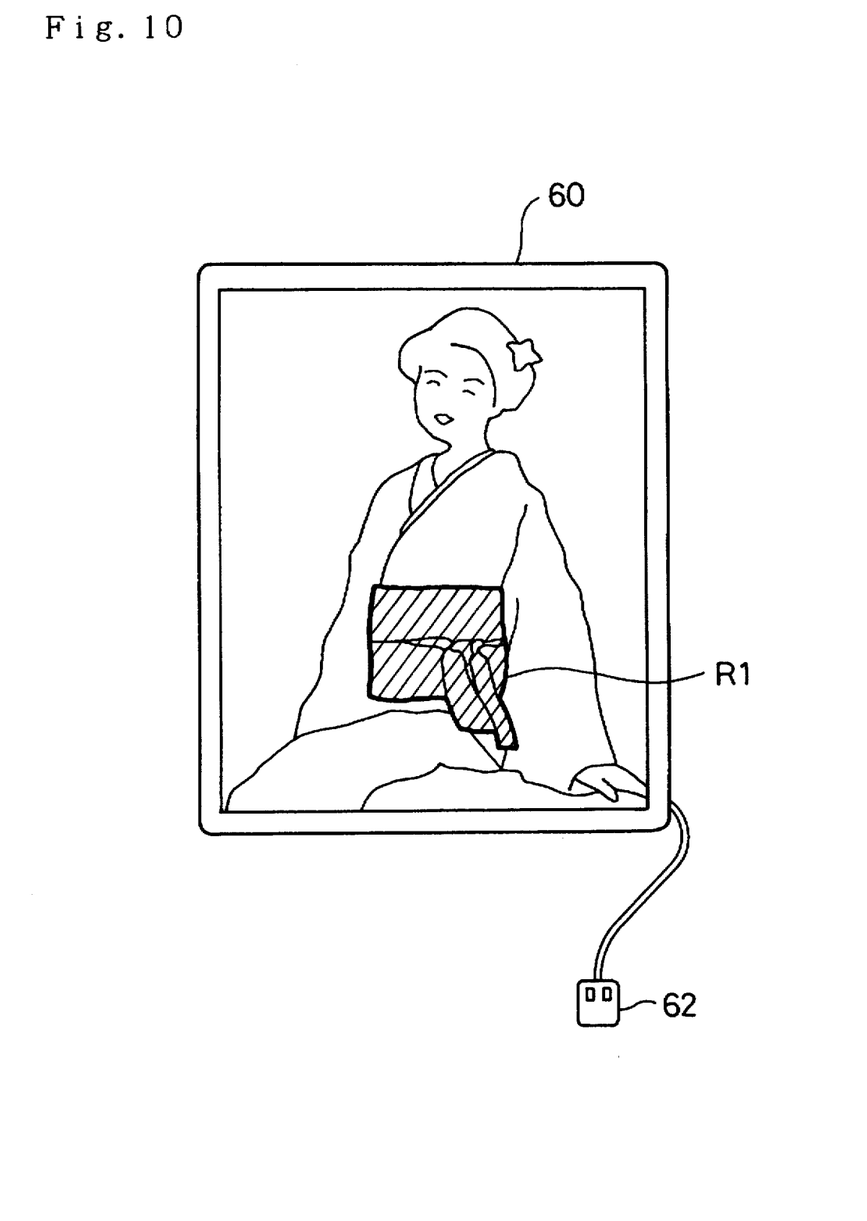
FIG. 10 shows a concept on which the user specifies an image area.

In still another possible embodiment, a display device may display a multi-level image representing a distribution of the filtered density data FDS or a binary image representing a distribution of the dot selection signal SEL so that the user can specify the high-resolution dot regions and the low-resolution dot regions through interactive operation while inspecting the displayed image. FIG. 10 schematically illustrates the region separation process by the interactive operation. Assuming that an Obi, or a Japanese Kimono belt, filled with slant lines in FIG. 10 has a detailed pattern, the pixels in an image region of the Obi have predominantly a relatively large value for the filtered density data FDS and the value '1' for the dot selection signal SEL. The user examines the distribution of the filtered density data FDS or that of the dot selection signal SEL displayed on a CRT display 60, and specifies a high-resolution dot region by designating an outline of an region having the high spatial frequencies, which is surrounded by the bold line in the drawing of FIG. 10, with a pointing device such as a mouse 62. Regions other than the high-resolution dot regions are recognized as the low-resolution dot regions. The user may specify either of the high-resolution dot regions or the low-resolution dot regions to separate the two regions.

If a user separates the high resolution dot regions and the low resolution dot regions, the user can selectively assign the high resolution dots to the regions where image details are required to be reproduced clearly. Since the user separates the regions based on the distribution of the filtered density data FDS or that of the dot selection signal SEL, the image regions can be separated according to not only the subjective view of the user but an objective indication. Although the dot-type assignment will be checked by a proof sheet, the above method securely assigns high resolution dots to the regions having high spatial frequencies, thus effectively reducing printing failures due to inappropriate dot-type assignment.

The above embodiments can be modified, for example, as follows.

Figure 11:
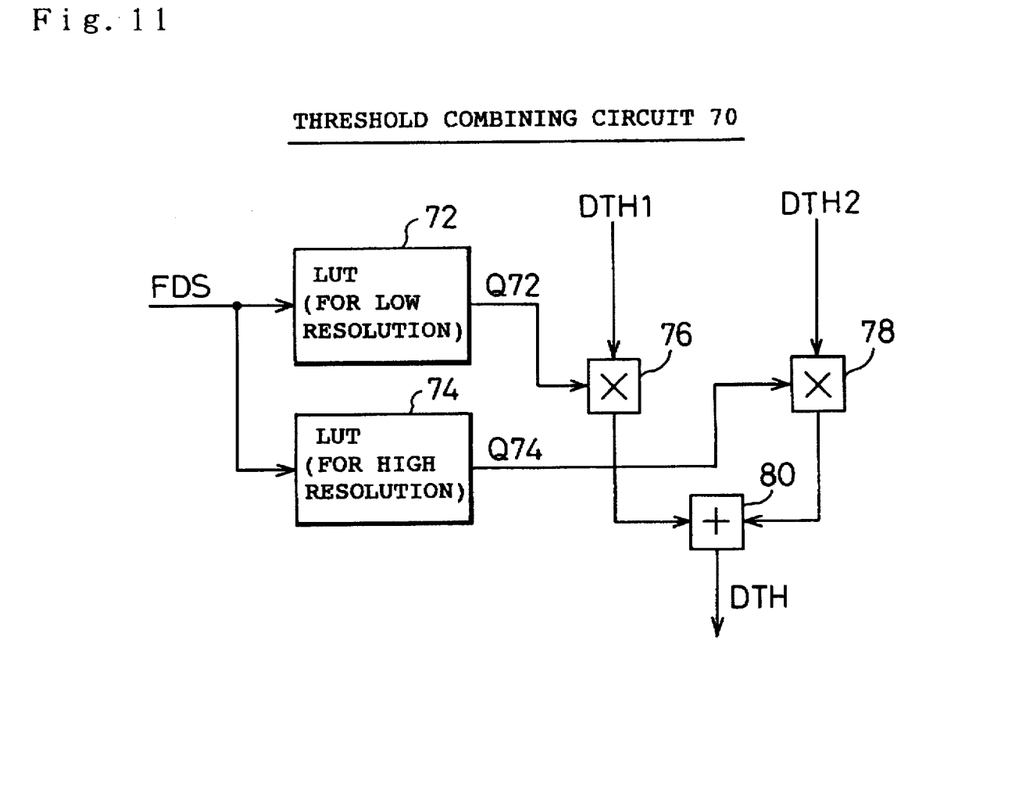
FIG. 11 is a block diagram showing structure of a threshold combining circuit.
Figure 12A:
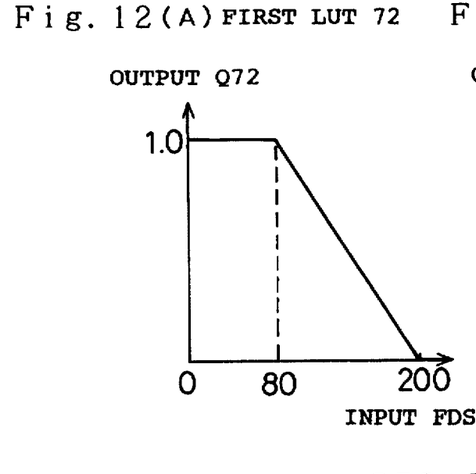
FIGS. 12(A) and 12(B) are graphs showing input-to-output characteristics of two look-up tables 72 and 74.
Figure 12B:
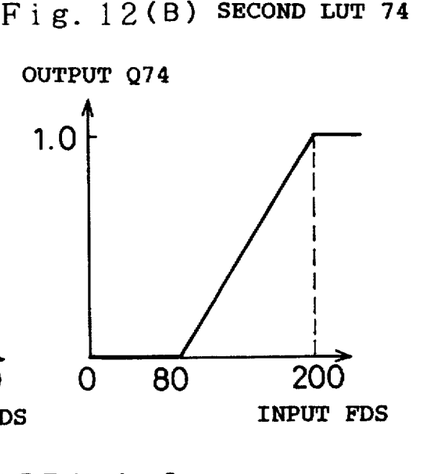

(1) A threshold combining circuit 70 shown in FIG. 11 may be used instead of the selector 52 shown in FIG. 2. The threshold combining circuit 70 includes two look-up tables 72 and 74, two multipliers 76 and 78, and an adder 80. The filtered density data FDS are input into the two look-up tables 72 and 74. FIGS. 12(A) and 12(B) are graphs showing input-to-output characteristics of the two look-up tables 72 and 74. In the first look-up table 72, the level of output data Q72 linearly decreases according to the level of the input data FDS. In the second look-up table 74, on the contrary, the level of output data Q74 linearly increases according to the level of the input data FDS. A total of the outputs (Q72+Q74) from the first and the second look-up tables 72 and 74 is normalized to 1.0. When the input data and the output data of the look-up tables are 8-bit digital data, the normalized value 1.0 in the graphs of FIG. 12 corresponds to $2^8$ (=256). Input data of 80 and 200 which correspond to a starting point and a terminal point of the linear characteristics in FIG. 12 are determined empirically.

The outputs Q72 and Q74 of the first and the second look-up tables 72 and 74 are respectively given to the first and the second multipliers 76 and 78 to be multiplied by the threshold data DTH1 and DTH2, respectively. As shown in FIG. 2, the threshold data DTH1 is assigned to the low resolution dots while the threshold data DTH2 is assigned to the high resolution dots. The outputs of the two multipliers 76 and 78 are summed by the adder 80 and transmitted as threshold data DTH to the comparator 54 (FIG. 2).

The two look-up tables 72 and 74 function to determine the weights Q72 and Q74, or synthesis ratios, for the two threshold data DTH1 and DTH2 according to the value of the filtered density data FDS. In short, the threshold combining circuit 70 shown in FIG. 11 determines the weights for the two threshold data DTH1 and DTH2 according to the value of the filtered density data FDS, and combines the two threshold data DTH1 and DTH2 using the weights. In an image region having intermediate spatial frequencies, a binary halftone image is recorded by mixture of the low resolution dots and the high resolution dots. This allows an image part on a border between a high-resolution dot region and a low-resolution dot region to be reproduced smoothly to give natural effects.

Figure 13:
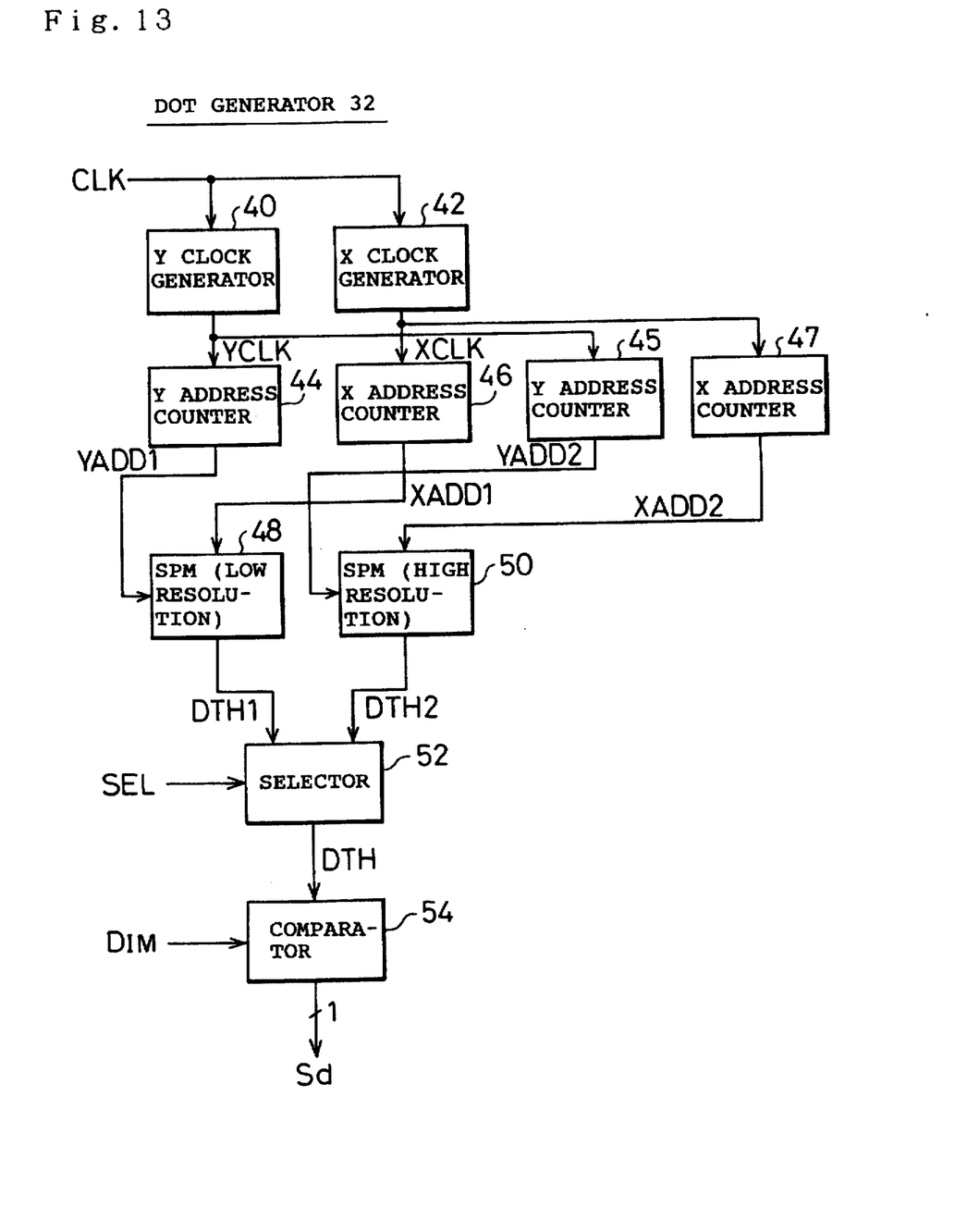
FIG. 13 is a block diagram showing another structure of the dot generator 32.

(2) In the above embodiment, the first and the second SPMs 48 and 50 are supposed to have an identical memory size and the Y address counter 44 and the X address counter 46 are applied commonly to the two SPMs 48 and 50 as shown in FIG. 2, for convenience of explanation and illustration. In actual structure, the second SPM 50 for FM dots may be much larger than the first SPM 48, and separate sets of address counters will be installed for the two SPM's. FIG. 13 shows an example of another structure of the dot generator 32, in which an Y address counter 45 and an X address counter 47 are added to supply addresses to the second SPM 50.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating a binary halftone image based on image data representing an original image, comprising the steps of:

measuring spatial frequencies in said original image by:
(a) obtaining density data indicative of a density of each pixel in said original image from said image data of said original image, and
(b) applying a second differential filter to said density data to thereby generate filtered density data indicative of a spatial frequency in the proximity of each pixel in said original image; and generating said binary halftone image by producing high resolution dots in a first image region and low resolution dots in a second image region, said first image region having spatial frequencies higher than a threshold frequency, said second image region having spatial frequencies lower than said threshold frequency, said generating step being performed by:
(a) comparing said filtered density data with said threshold frequency to thereby generate a selection signal for each pixel, and
(b) selecting one of said high resolution dots and said low resolution dots to each pixel in response to said selection signal.

2. A method in accordance with claim 1, wherein said step (f) comprises the step of:
(g) dividing said original image into said first image region and said second image region based on a distribution of said selection signal.

3. A method in accordance with claim 2, wherein said step (g) comprises the steps of:
dividing said original image into a plurality of unit areas of an identical size; and
obtaining a logical sum of said selection signal for a plurality of pixels in each of said plurality of unit areas, to thereby identifying each of said plurality of unit area as one of said first and second image regions.

4. A method in accordance with claim 2, wherein said step (g) comprises the steps of:
displaying a binary image representing said distribution of said selection signal in said original image on a display device; and
dividing said original image into said first image region and said second image region through interactive operation while observing said binary image displayed on said display device.

5. A method in accordance with claim 2, wherein said step (g) comprises the steps of:
displaying a multi-valued image representing a distribution of said filtered density data on a display device; and
dividing said original image into said first image region and said second image region through interactive operation while observing said multi-valued image displayed on said display device.

6. A method of generating a binary halftone image based on image data representing an original image, comprising the steps of:

measuring spatial frequencies in said original image by:
(a) providing a first threshold pattern for said high resolution dots and a second threshold pattern for said low resolution dots,
(b) obtaining density data indicative of a density of each pixel in said original image from said image data of said original image,
(c) applying a second differential filter to said density data to thereby generate filtered density data indicative of a spatial frequency in the proximity of each pixel in said original image, and
(d) determining a first coefficient for said high resolution dots and a second coefficient for said low resolution dots from said filtered density data of each pixel; and generating said binary halftone image by producing high resolution dots in a first image region and low resolution dots in a second image region, said first image region having spatial frequencies higher than a threshold frequency, said second image region having spatial frequencies lower than said threshold frequency, said generating step being performed by:
(a) reading out a first threshold value from said first threshold pattern and a second threshold value from said second threshold pattern with respect to each pixel in said original image,
(b) multiplying said first threshold value by said first coefficient and said second threshold value by said second coefficient, and generating a third threshold value by adding the results of multiplication,
(c) comparing said image data with said third threshold with respect to each pixel in said original image, to thereby generate a dot signal representing said binary halftone image, and
(d) generating said binary halftone image from said dot signal.

7. An apparatus for generating a binary halftone image based on image data representing an original image, comprising:

frequency measuring means for measuring spatial frequencies in said original image, said frequency measuring means including:
- (a) means for obtaining density data indicative of a density of each pixel in said original image from said image data of said original image, and
- (b) means for applying a second differential filter to said density data to thereby generate filtered density data indicative of a spatial frequency in the proximity of each pixel in said original image, and dot generation means for generating said binary halftone image by producing high resolution dots in a first image region and low resolution dots in a second image region, said first image region having spatial frequencies higher than a threshold frequency, said second image region having spatial frequencies lower than said threshold frequency said dot generation means including:
- (a) means for comparing said filtered density data with said threshold frequency to thereby generate a selection signal for each pixel, and
- (b) selection means for selecting one of said high resolution dots and said low resolution dots to each pixel in response to said selection signal.

8. An apparatus in accordance with claim 7, wherein said selection means comprises:

division means for dividing said original image into said first image region and said second image region based on a distribution of said selection signal.

9. An apparatus in accordance with claim 8, wherein said division means comprises:

means for dividing said original image into a plurality of unit areas of an identical size; and means for obtaining a logical sum of said selection signal for a plurality of pixels in each of said plurality of unit areas, to thereby identifying each of said plurality of unit area as one of said first and second image regions.

10. An apparatus in accordance with claim 8, further comprising:

a display device for displaying a binary image representing said distribution of said selection signal in said original image; and wherein said division means comprises:
means for specifying to divide said original image into said first image region and said second image region through interactive operation while observing said binary image displayed on said display device.

11. An apparatus in accordance with claim 8, further comprising:

a display device for displaying a binary image representing said distribution of said selection signal in said original image; and wherein said division means comprises:
means for specifying to divide said original image into said first image region and said second image region through interactive operation while observing said multi-valued image displayed on said display device.

12. An apparatus for generating a binary halftone image based on image data representing an original image, comprising:

a first threshold memory for storing a first threshold pattern for said high resolution dots; and a second threshold memory for storing a second threshold pattern for said low resolution dots;

frequency measuring means for measuring spatial frequencies in said original image said frequency measuring means including:
- (a) means for obtaining density data indicative of a density of each pixel in said original image from said image data of said original image,
- (b) means for applying a second differential filter to said density data to thereby generate filtered density data indicative of a spatial frequency in the proximity of each pixel in said original image, and
- (c) means for determining a first coefficient for said high resolution dots and a second coefficient for said low resolution dots from said filtered density data of each pixel; and dot generation means for generating said binary halftone image by producing high resolution dots in a first image region and low resolution dots in a second image region, said first image region having spatial frequencies higher than a threshold frequency, said second image region having spatial frequencies lower than said threshold frequency, said dot generation means including:
- (a) means for reading out a first threshold value from said first threshold memory and a second threshold value from said second threshold memory with respect to each pixel in said original image,
- (b) means for multiplying said first threshold value by said first coefficient and said second threshold value by said second coefficient, and generating a third threshold value by adding the results of multiplication,
- (c) a comparator for comparing said image data with said third threshold with respect to each pixel in said original image, to thereby generate a dot signal representing said binary halftone image, and
- (d) means for generating said binary halftone image from said dot signal.

13. A method of generating a binary halftone image based on image data representing an original image, said method comprising the steps of:
- (a) measuring spatial frequencies in said original image by applying a differential filter to said image data; and
- (b) generating said binary halftone image by producing high resolution dots in a first image region and low resolution dots in a second image region, said first image region having spatial frequencies higher than a threshold frequency, said second image region having spatial frequencies lower than said threshold frequency, said low resolution dots being conventional halftone dots, said high resolution dots being frequency modulation dots whose spacing varies with image density.

14. An apparatus for generating a binary halftone image based on image data representing an original image, said apparatus comprising:

frequency measuring means for measuring spatial frequencies in said original image by applying a differential filter to said image data; and dot generation means for generating said binary halftone image by producing high resolution dots in a first image region and low resolution dots in a second image region, said first image region having spatial frequencies higher than a threshold frequency, said second image region having spatial frequencies lower than said threshold frequency, said low resolution dots being conventional halftone dots, said high resolution dots being frequency modulation dots whose spacing varies with image density.

* * * * *